US011153085B2

(12) United States Patent
Villapakkam et al.

(10) Patent No.: US 11,153,085 B2
(45) Date of Patent: Oct. 19, 2021

(54) SECURE DISTRIBUTED STORAGE OF ENCRYPTION KEYS

(71) Applicant: EMC IP Holding Company LLC, Hopkinton, MA (US)

(72) Inventors: Sridhar Villapakkam, Grafton, MA (US); Ajit Bhagwat, Lexington, MA (US); Frank S. Caccavale, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 457 days.

(21) Appl. No.: 16/175,356

(22) Filed: Oct. 30, 2018

(65) Prior Publication Data

US 2020/0136822 A1 Apr. 30, 2020

(51) Int. Cl.
*H04L 9/08* (2006.01)
*H04L 9/32* (2006.01)

(52) U.S. Cl.
CPC .......... *H04L 9/0894* (2013.01); *H04L 9/0866* (2013.01); *H04L 9/32* (2013.01)

(58) Field of Classification Search
CPC ....... H04L 9/0894; H04L 9/0866; H04L 9/32; H04L 63/061; H04L 63/0884; H04L 67/10; H04L 9/3247
See application file for complete search history.

(56) References Cited

U.S. PATENT DOCUMENTS

| 7,502,467 | B2 | 3/2009 | Brainard et al. |
| 8,059,814 | B1 | 11/2011 | Duane |
| 8,645,681 | B1 | 2/2014 | D'Souza |
| 9,594,918 | B1 | 3/2017 | Robinson et al. |
| 2008/0019527 | A1* | 1/2008 | Youn ...................... H04L 9/083 380/278 |
| 2014/0019753 | A1* | 1/2014 | Lowry .................... H04L 9/083 713/155 |
| 2017/0324550 | A1* | 11/2017 | Yuan ...................... H04L 9/0894 |

OTHER PUBLICATIONS

Dell EMC; "Dell EMC Unity: Cloud Tiering Appliance (CTA)," white paper, Nov. 2017.

* cited by examiner

*Primary Examiner* — Farid Homayounmehr
*Assistant Examiner* — Suman Debnath
(74) *Attorney, Agent, or Firm* — BainwoodHuang

(57) ABSTRACT

Techniques are presented for (a) securely maintaining, by a computing device, a set of correspondences between encryption keys and key identifiers, (b) receiving, by the computing device, a cryptographic request from a remote device received across the network, the cryptographic request including credentials, data to be cryptographically processed, and a key identifier to be used for cryptographic processing, and (c) in response to successfully authenticating the cryptographic request: (1) obtaining, by the computing device with reference to the set of correspondences, an encryption key corresponding to the key identifier, (2) cryptographically processing, by the computing device, the received data using the obtained encryption key to generate cryptographically-processed data, and (3) sending the cryptographically-processed data from the computing device across the network to the remote device. Embodiments are directed to methods, apparatuses, systems, and computer program products for performing these techniques.

16 Claims, 5 Drawing Sheets

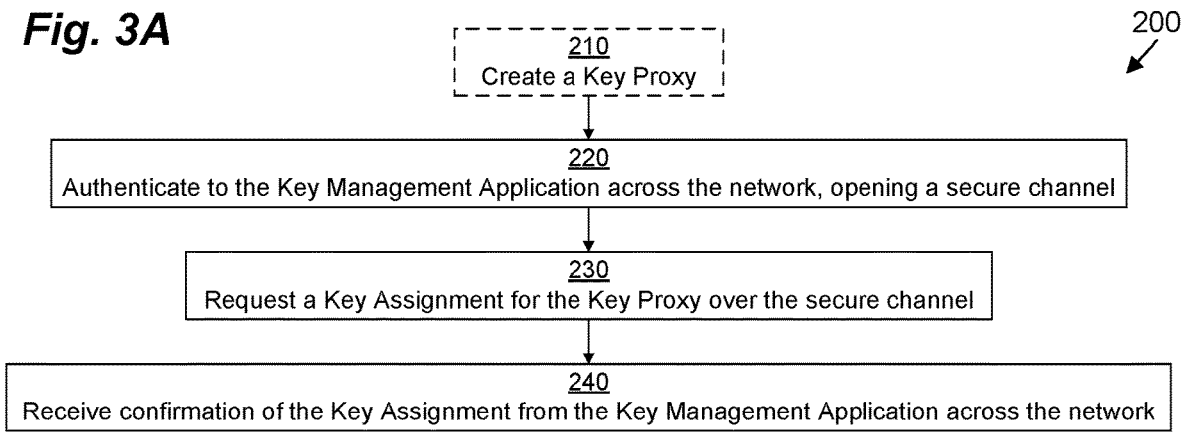
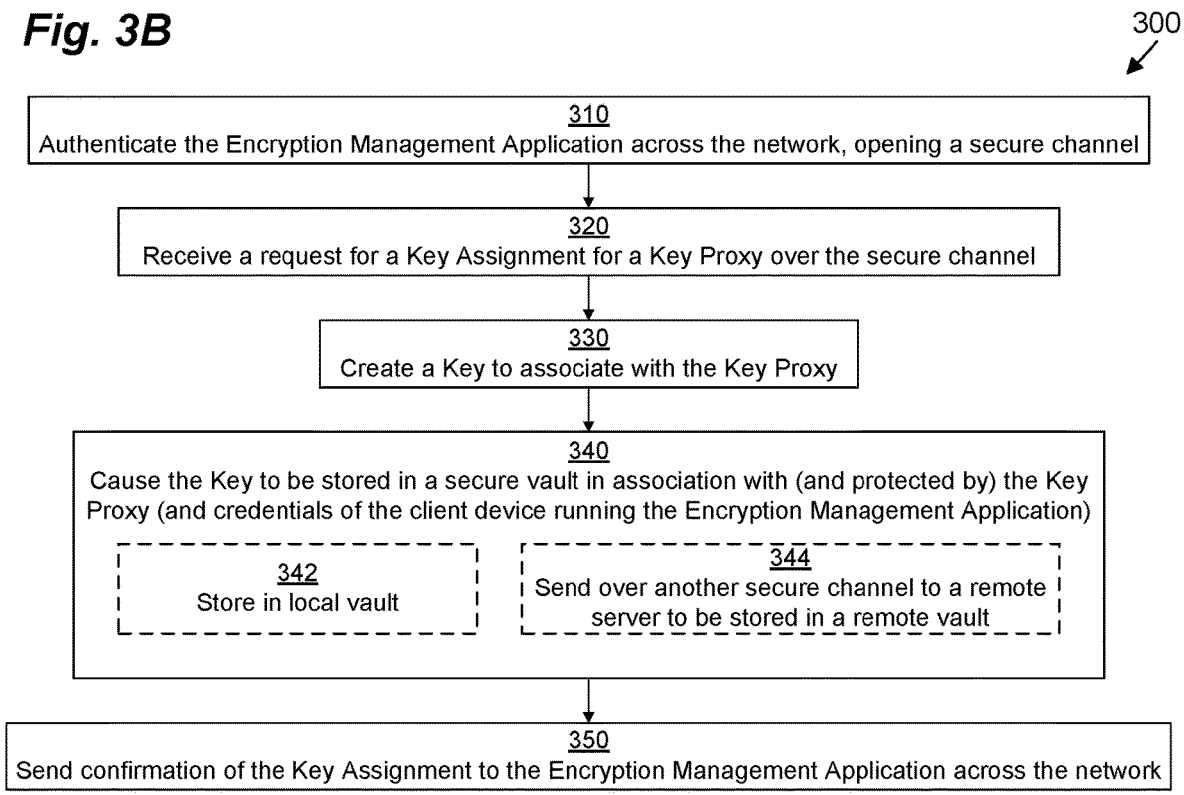

SECURE DISTRIBUTED STORAGE OF ENCRYPTION KEYS

BACKGROUND

In recent years it has become popular to store data "in the cloud." For example, users may subscribe to a service over a network (e.g., the Internet) that stores the user's data in a widely-distributed storage system. This approach is useful because it allows the user to access data from anywhere around the world while also providing protection against catastrophic loss of data at any one physical location.

Some users may want their data to be encrypted in the cloud. Encryption may be accomplished using one or more encryption keys. As several users may store data within the same distributed storage system managed by a cloud service, there will typically be different keys used for each user (or possibly several keys per user). In order to keep track of which data is protected by which keys, some cloud services store a code in connection with each piece of data that can be used to identify which key was used to encrypt that data. The code allows a cloud-access application to locate the appropriate key to use to access the data. The cloud access application securely stores the keys (e.g., using an encrypted lookup table) so that it may access them.

SUMMARY

Unfortunately, the above-described approach is not always optimal. For example, if a hacker is able to access the computer system on which the cloud-access application is running, the hacker may be able to pretend to be the cloud-access application and access a secure vault in which the keys are stored, compromising the security. In addition, because the keys are stored securely on a single system, there may be resource contention and/or data unavailability if that system is down.

Thus, it would be desirable to securely store the keys on systems remote from the cloud-access applications with a requirement for authentication to allow a cloud-access application running on a variety of systems to access the keys using key proxies while still maintaining security. This result may be accomplished by having the cloud-access application run on one computer while authenticating to a remote computer that stores the keys in a vault. The remote computer, after locating a key in a vault using the key proxy provided by the cloud-access application, performs the encryption or decryption of the data itself, so that the cloud-access application does not need to directly access the keys. Rather, the cloud-access application only need authenticate with the remote server to prove its identity and permission to use the keys in question.

In one embodiment, a method of cryptographic processing across a network is provided. The method includes (a) securely maintaining, by a computing device, a set of correspondences between encryption keys and key identifiers, (b) receiving, by the computing device, a cryptographic request from a remote device received across the network, the cryptographic request including credentials, data to be cryptographically processed, and a key identifier to be used for cryptographic processing, and (c) in response to successfully authenticating the cryptographic request: (1) obtaining, by the computing device with reference to the set of correspondences, an encryption key corresponding to the key identifier, (2) cryptographically processing, by the computing device, the received data using the obtained encryption key to generate cryptographically-processed data, and (3) sending the cryptographically-processed data from the computing device across the network to the remote device. A system, apparatuses, and computer program products for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIGS. 3A and 3B are flowcharts depicting example methods of various embodiments from various perspectives.

DETAILED DESCRIPTION OF THE INVENTION

Figure 1:
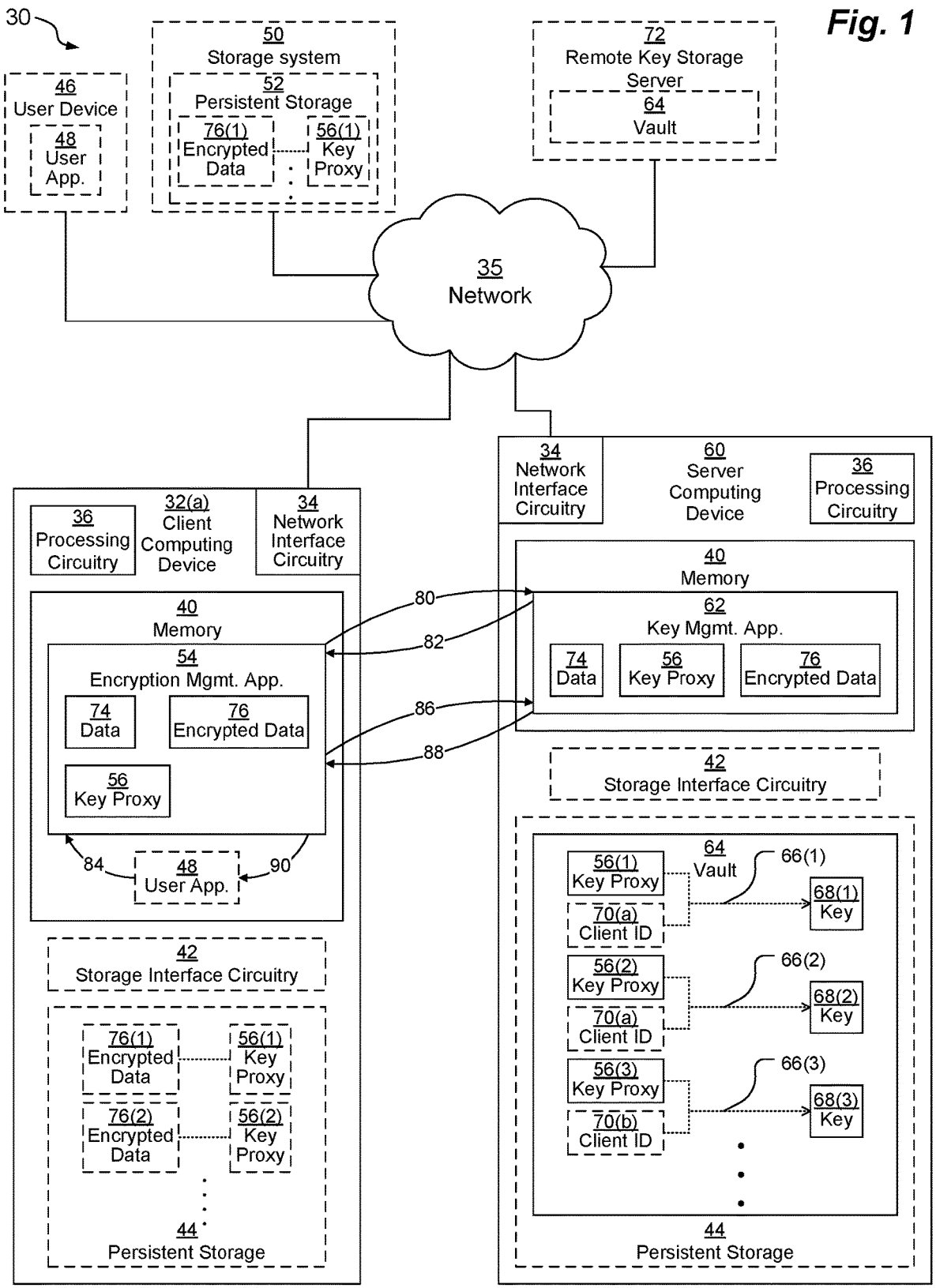
FIG. 1 is a block diagram depicting an example system and apparatuses for use in connection with various embodiments.

Embodiments are directed to techniques for securely storing keys on systems remote from cloud-access applications with a requirement for authentication to allow a cloud-access application running on a variety of systems to access the keys using key proxies while still maintaining security. This result may be accomplished by having the cloud-access application run on one computer while authenticating to a remote computer that stores the keys in a vault. The remote computer, after locating a key in a vault using the key proxy provided by the cloud-access application, performs the encryption or decryption of the data itself, so that the cloud-access application does not need to directly access the keys. Rather, the cloud-access application only need authenticate with the remote server to prove its identity and permission to use the keys in question FIG. 1 depicts a system 30 including one or more client computing devices 32 (depicted as client computing device 32(a)) connected to a server computing device 60 via a network 35. Client computing devices 32 and server computing device 60 may be any kind of computing devices, such as, for example, a personal computer, workstation, server computer, enterprise server, DSS rack server, laptop computer, tablet computes, smart phone, mobile computer, etc. In an example, client computing device 32(a) and server computing device 60 are servers.

Client computing devices 32 and server computing device 60 each include network interface circuitry 34, processing circuitry 36, and memory 40. In some embodiments, client computing devices 32 and server computing device 60 also include storage interface circuitry 42, and persistent data storage 44. Client computing devices 32 and server computing device 60 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the client computing devices 32 to communicate with the server computing device 60, and, in some embodiments, to one or more user devices 46 and/or one or more storage systems 50. In an example, a storage system 50 is a data storage system (DSS) rack server, such as a VNX, VMAX, Isilon, or XtremIO data storage array produced by Dell/EMC of Hopkinton, Mass.

Network interface circuitry 34 allows the server computing device 60 to communicate with client computing devices 32 and, in some embodiments, with a remote key storage server 72.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS, not depicted) in operation (e.g., a Linux, UNIX, Windows, MacOS, or similar operating system).

Memory 40 of a client computing device 32(a) stores encryption management application (EMA) 54, which executes on processing circuitry 36 of client computing device 32(a). EMA 54 stores various information, including unencrypted user data 74, encrypted user data 76, and a key proxy 56 (also referred to as a key identifier) that identifies a key used for encrypting the data 74 and decrypting the encrypted data 76. In some embodiments, memory 40 of a client computing device 32(a) may also store a user application 48. User application 48 makes use of the unencrypted user data 74 and/or encrypted user data 76. In some embodiments, user application may run on a remote user device 46 either instead of or in addition to running on client computing device 32(a).

In some embodiments, user application 48 is a data storage application configured to store user data in encrypted form as encrypted data 76 in persistent storage 44, 52 together with an associated key proxy 56 and to retrieve the user data in unencrypted form upon a user request or a request from another user application. For example, in one embodiment, user application 48 runs on client computing device 32(a) and stores encrypted data 76(1), 76(2), . . . on persistent storage 44 of client computing device 32(a). User application 48 also stores a key proxy 56 in association with the encrypted data 76 so that the key used for that encrypted data 76 can be located. Thus, as depicted, encrypted data 76(1) is stored in association with key proxy 56(1) and encrypted data 76(2) is stored in association with key proxy 56(2). It should be understood that there are various ways to store the key proxy 56 in association with the encrypted data 76, any of which may be used. For example, the key proxy 56 may be stored in metadata of an encrypted file (e.g., within an inode of a file containing encrypted data 76, in other metadata, etc.), a reference to the key proxy 56 may be stored in a table mapping regions of storage to key proxies 56, etc.

As another example, in one embodiment, user application 48 runs on remote user device 46 and stores encrypted data 76(1), . . . on persistent storage 52 of remote storage system 50. User application 48 also stores a key proxy 56(1), . . . in association with the encrypted data 76 so that the key used for that encrypted data 76 can be located.

Memory 40 of server computing device 60 stores key management application (KMA) 62, which executes on processing circuitry 36 of server computing device 60. KMA 54 stores various information, including unencrypted user data 74, encrypted user data 76, and key proxy 56.

On both client computing device 32(a) and server computing device 60, memory 40 may also store various other data structures used by the OS and various applications (e.g., EMA 54, user application 48, KMA 62, and other applications not depicted).

In some embodiments, server computing device 60 stores a secure vault 64 within its persistent storage 44. In other embodiments, the secure vault 64 may instead be stored on remote key storage server 72.

Secure vault 64 stores a set of encryption keys 68 (depicted as keys 68(1), 68(2), 68(3), . . . ), each associated with a respective key proxy 56 (depicted as key proxies 56(1), 56(2), 56(3), . . . ) via a set of associations 66 (depicted as associations 66(1), 66(2), 66(3), . . . ). In some embodiments, the associations 66 also include particular client identifiers (client IDs) 70. As depicted, client ID 70(a), identifying client computing device 32(a) (and/or the EMA 54 running thereon), is associated with keys 68(1) and 68(2), but a different client ID 70(b), identifying a different client computing device 32 (not depicted), is associated with key 68(3).

The keys 68 are stored within the secure vault 64 in encrypted form so that the secure vault 64 is protected even if a rogue actor is able to access the secure vault 64 (e.g., by stealing the persistent storage 44). In some embodiments, the key proxies 56 and/or client IDs 70 are stored in the secure vault 64, either in encrypted or non-encrypted format. In other embodiments, one or both of the key proxies 56 and/or client IDs 70 are not directly stored in the secure vault 64; rather, the associations 66 are encoded by choosing an encryption key with which to encode the stored keys 68 such that the encoded encryption key for a particular key (e.g., 68(1)) is derivable from the associated key proxy (e.g., 56(1) and/or the client ID (e.g., 70(a)). In some embodiments, multiple client IDs 70 may be associated with a single association 66 so that several different client computing devices 32 may indirectly access a particular key 68 if in possession of the appropriate key proxy 56.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the computing device 32, 60 is powered off. The OS and applications (e.g., EMA 54, user application 48, KMA 62, and other applications not depicted) are typically stored in this persistent storage portion of memory 40 or on persistent storage 44 so that they may be loaded into a system portion of memory 40 from this persistent storage portion of memory 40 or persistent storage 44 upon a system restart or as needed. EMA 54, user application 48, and KMA 62, when stored in non-transient form either in the volatile portion of memory 40 or on persistent storage drives 44 or in persistent portion of memory 40, forms a computer program product. The processing circuitry 36 running one or more applications thus forms a specialized circuit constructed and arranged to carry out the various processes described herein.

In operation, EMA 54 running on client computing device 32(a) sends a request 80 for a key proxy assignment to KMA 62 over network 35. In some embodiments, EMA 54 may first generate a key proxy 56 and then send that pre-generated key proxy 56 to the KMA 62 as part of the request 80 for the key proxy assignment. In some embodiments, the request 80 for the key proxy assignment may include a preliminary step of authenticating the client computing device 32(a) or the particular instance of the EMA 54 running on the client computing device 32(a) based on credentials (not depicted) of the client computing device 32(a) or of the particular instance of the EMA 54 running on the client computing device 32(a). In some embodiments, a secure channel (not depicted) across network 35 between EMA 54 and KMA 62 may be established as part of this authentication process.

In response to KMA 62 receiving the request 80, KMA 62 generates a key 68 to associate with the key proxy 56 (either generating the key proxy 56 itself or using the key proxy received within the request 80) and causes the generated key 68 to be securely stored within the secure vault 64 (either locally or on remote key storage server 72) in association with the key proxy 56 (and, in some embodiments, also in association with the credentials used in the authentication). KMA 62 also sends an assignment confirmation 82 back to the EMA 54 to confirm that the key proxy 56 has been successfully associated with a key 68. In embodiments in which the KMA 62 generates the key proxy 56, the assignment confirmation 82 also includes the key proxy 56. In some embodiments, assignment confirmation 82 may also be sent across the secure channel.

In continued operation, at some point, a user application 48, running either on client computing device 32(a) or on a remote user device 46 sends a request 84 for protected data access to the EMA 54. For example, in one embodiment, user application 48 on remote user device 46 wants to store data 74 securely within a cloud storage system (not depicted). As another example, user application 48 on remote user device 46 wants to access data 74 that was previously securely stored within a cloud storage system (not depicted) as encrypted data 76. As another example, in one embodiment, user application 48 running on the client computing device 32(a) wants to securely store data 74 within persistent storage 44 of the client computing device 32(a). As another example, user application 48 on the client computing device 32(a) wants to access data 74 that was previously securely stored within persistent storage 44 of the client computing device 32(a) as encrypted data 76.

In response to EMA 54 receiving the protected data access request 84, EMA 54 sends a cryptographic request 86 to KMA 62 over network 35 including a previously-established key proxy 56 and either non-encrypted data 74 or encrypted data 76. If user application 48 wants to access encrypted data 76 already stored within persistent storage 44, 52, then the cryptographic request 86 is a decryption request that includes the encrypted data 76 as well as the key proxy 56 that was stored in association therewith on persistent storage 44, 52. If user application 48 wants to newly store non-encrypted data 74 within persistent storage 44, 52, then the cryptographic request 86 is an encryption request that includes the non-encrypted data 74 as well as a previously-generated key proxy 56 that is intended to identify which key 68 to use to encrypt the data 74.

In some embodiments, the cryptographic request 86 may include a preliminary step of authenticating the client computing device 32(a) or the particular instance of the EMA 54 running on the client computing device 32(a) based on credentials (not depicted) of the client computing device 32(a) or of the particular instance of the EMA 54 running on the client computing device 32(a). In some embodiments, a secure channel (not depicted) across network 35 between EMA 54 and KMA 62 may be established as part of this authentication process.

In response to KMA 62 receiving the cryptographic request 86, KMA 62 retrieves the key 68 that was previously associated with the received key proxy 56 from the vault 64 (either locally or on remote key storage server 72). In some embodiments, KMA 62 also sends the credentials used in the authentication to the secure vault 64 in order to obtain the key 68. KMA 62 then uses the key 68 obtained from the vault 64 to cryptographically process the request. This cryptographic processing may either take the form of encrypting received data 74 in the case of an encryption request or decrypting received encrypted data 76 in the case of a decryption request. Afterwards, KMA 62 sends the cryptographically-processed data 88 (either decrypted data 74 in the case of a decryption request or encrypted data 76 in the case of an encryption request) back to the EMA 54. In some embodiments, cryptographically-processed data 88 is sent across the secure channel, particularly if it contains decrypted data 74 in the case of a decryption request.

In response to EMA 54 receiving the cryptographically-processed data 88 from KMA 62. EMA 54 sends a protected data access response 90 back to the requesting user application 48 with the cryptographically-processed data 88. The user application 48 is then able to make use of the cryptographically-processed data 88. For example, if the cryptographically-processed data 88 includes encrypted data 76, then the user application 48 may locally store the encrypted data 76 in connection with the key proxy 56 on persistent storage 44 or it may send a storage request to remote storage system 50 directing the remote storage system to store the encrypted data 76 in connection with the key proxy 56 on its persistent storage 52. As another example, if the cryptographically-processed data 88 includes decrypted data 74, then the user application 48 may either send the decrypted data 74 to a user or it may perform further processing on that decrypted data 74.

Figure 2:
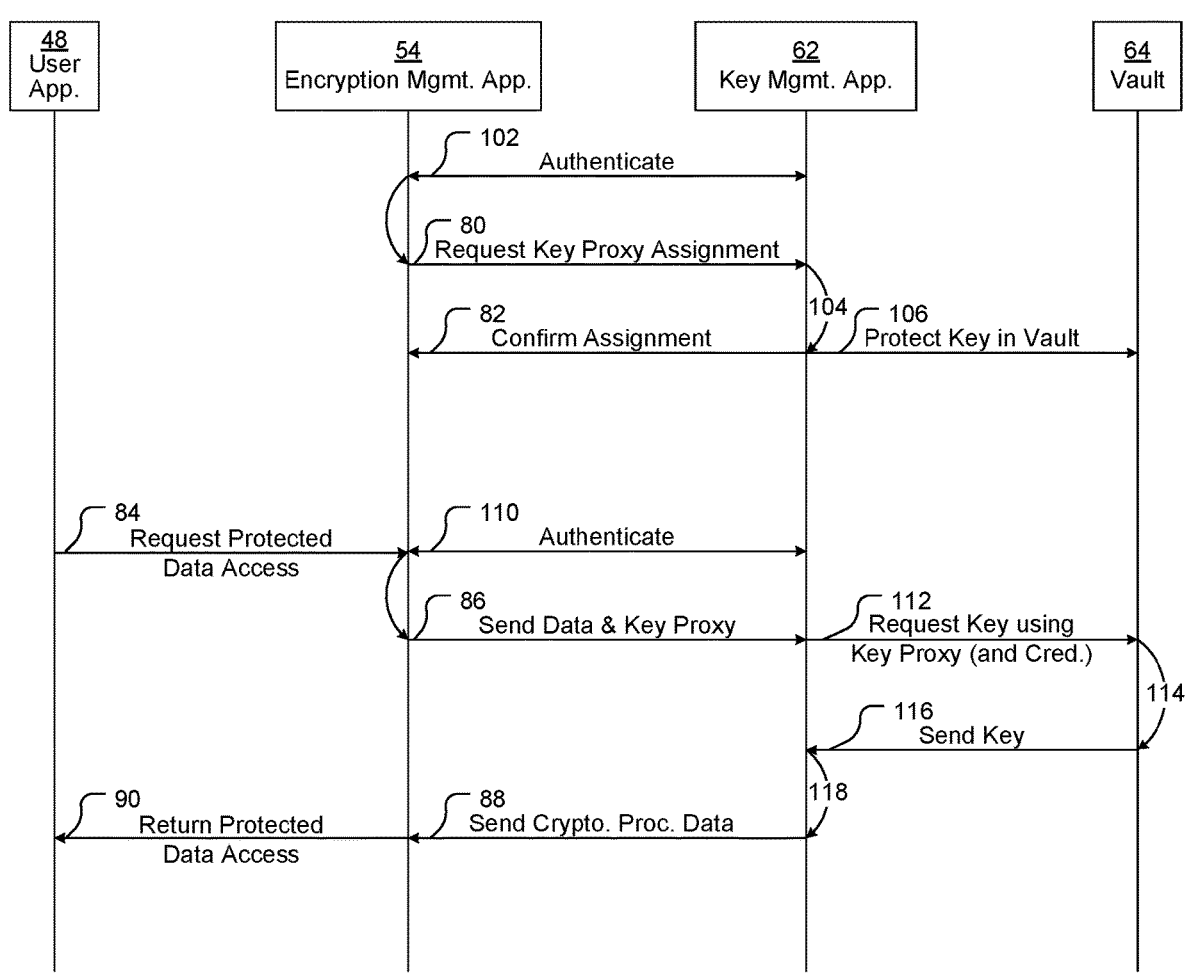
FIG. 2 is a sequence diagram depicting example methods of various embodiments.

FIG. 2 illustrates an example method 100 performed within system 30. In operation, EMA 54 running on client computing device 32(a) preliminarily performs an authentication 102 with KMA 62 running on server computing device 60 over network 35. Authentication 102 involves EMA 54 sending credentials (not depicted) of the client computing device 32(a) or of the particular instance of the EMA 54 running on the client computing device 32(a) to KMA 62 for verification, after which a secure channel may be established across network 35 between EMA 54 and KMA 62.

Then, EMA 54 sends request 80 for a key proxy assignment to KMA 62 over network 35 (noting that it should be understood that request 80 may be understood to also include the authentication 102, although not depicted as such in FIG. 2). In some embodiments, EMA 54 may first generate a key proxy 56 and then send that pre-generated key proxy 56 to the KMA 62 as part of the request 80 for the key proxy assignment. In some embodiments, EMA 54 sends the key proxy 56 to the KMA 62 using the secure channel established as part of the authentication 102.

In response to KMA 62 receiving the request 80, KMA 62 performs a generation/association step 104 by generating a key 68 to associate with the key proxy 56 (either generating the key proxy 56 itself or using the key proxy received within the request 80). KMA 62 also performs an insertion step 106 to cause the generated key 68 to be securely stored within the secure vault 64 in association with the key proxy 56 (and, in some embodiments, also in association with the credentials used in the authentication). Insertion step 106 may be performed locally with respect to vault 64 on persistent storage 44 of the server computing device 60 or it may include sending both the key proxy 56 and the generated key 68 (and, in some embodiments, credentials of the EMA 54 or client computing device 32(a)) to a remote key storage server 72 with instructions to securely store the generated key 68 within its secure vault 64 in association with the key proxy 56 (and, in some embodiments, also in association with the credentials used in the authentication). In embodiments in which the insertion step 106 is performed in conjunction with remote key storage server 72, KMA 62 sends the instructions and associated information to the remote key storage server 72 over a secure channel between KMA 62 and the remote key storage server 72 to prevent eavesdropping.

KMA 62 then sends an assignment confirmation 82 back to the EMA 54 to confirm that the key proxy 56 has been successfully associated with a key 68. In embodiments in which the KMA 62 generates the key proxy 56, the assignment confirmation 82 also includes the key proxy 56. In some embodiments, assignment confirmation 82 may also be sent across the secure channel established as part of authentication 102.

In continued operation, at some point, a user application 48, running either on client computing device 32(a) or on a remote user device 46 sends a request 84 for protected data access to the EMA 54. In response to EMA 54 receiving the protected data access request 84, EMA 54 running on client computing device 32(a) preliminarily performs an authentication 110 with KMA 62 running on server computing device 60 over network 35. Authentication 110 involves EMA 54 sending credentials (not depicted) of the client computing device 32(a) or of the particular instance of the EMA 54 running on the client computing device 32(a) to KMA 62 for verification, after which a secure channel may be established across network 35 between EMA 54 and KMA 62.

Then, EMA 54 sends a cryptographic request 86 to KMA 62 over network 35 (noting that it should be understood that request 86 may be understood to also include the authentication 110, although not depicted as such in FIG. 2) including a previously-established key proxy 56 and either non-encrypted data 74 or encrypted data 76. If user application 48 wants to access encrypted data 76 already stored within persistent storage 44, 52, then the cryptographic request 86 is a decryption request that includes the encrypted data 76 as well as the key proxy 56 that was stored in association therewith on persistent storage 44, 52. If user application 48 wants to newly store non-encrypted data 74 within persistent storage 44, 52, then the cryptographic request 86 is an encryption request that includes the non-encrypted data 74 as well as a previously-generated key proxy 56 that is intended to identify which key 68 to use to encrypt the data 74. In some embodiments, EMA 54 sends the cryptographic request 86 to the KMA 62 using the secure channel established as part of the authentication 110, particularly if the cryptographic request 86 includes non-encrypted data 74.

In response to KMA 62 receiving the cryptographic request 86, KMA 62 sends a key request 112 to the secure vault 64 including the key proxy 56. In some embodiments, KMA 62 also sends the credentials used in the authentication 110 to the secure vault 64 as part of the key request 112. Key request 112 may be send locally with respect to vault 64 on persistent storage 44 of the server computing device 60 or it may instead be sent to a remote key storage server 72 with instructions to securely store the generated key 68 within its secure vault 64 in association with the key proxy 56 (and, in some embodiments, also in association with the credentials used in the authentication 110). In embodiments in which the key request 112 is sent to the remote key storage server 72, KMA 62 sends the key request 112 over a secure channel between KMA 62 and the remote key storage server 72 to prevent eavesdropping.

In response, the secure vault 64 performs a retrieval step 114 to retrieve the key 68 that was previously associated with the key proxy 56. In some embodiments, retrieval step 114 also includes using the credentials used in authentication 110 in order to obtain the key 68. Then, secure vault 64 performs a key response step 116 in which it returns the retrieved key 68 to KMA 62. In embodiments in which the key request 112 was sent to the remote key storage server 72, remote key storage server 72 sends the key 68 over the secure channel between KMA 62 and the remote key storage server 72 to prevent eavesdropping.

KMA 62 then performs cryptographic processing 118 in which it uses the key 68 obtained from the vault 64 to cryptographically process the cryptographic request 86. This cryptographic processing 118 may either take the form of encrypting received data 74 in the case of an encryption request or decrypting received encrypted data 76 in the case of a decryption request. Afterwards, KMA 62 sends the cryptographically-processed data 88 (either decrypted data 74 in the case of a decryption request or encrypted data 76 in the case of an encryption request) back to the EMA 54. In some embodiments, cryptographically-processed data 88 is sent across the secure channel established as part of authentication 110, particularly if it contains decrypted data 74 in the case of a decryption request.

In response to EMA 54 receiving the cryptographically-processed data 88 from KMA 62. EMA 54 sends a protected data access response 90 back to the requesting user application 48 with the cryptographically-processed data 88. The user application 48 is then able to make use of the cryptographically-processed data 88.

FIG. 3A illustrates an example method 200 performed by EMA 54 running on client computing device 32(a) in conjunction with other applications for setting up an encryption key 68 and associated key proxy 56. It should be understood that any time a piece of software (e.g., EMA 54, user application 48, KMA 62, etc.) is described as performing a method, process, step, or function, in actuality what is meant is that a computing device (e.g., client computing device 32(a), server computing device 60, user device 46, storage system 50, remote key storage server 72, etc.) on which that piece of software is running performs the method, process, step, or function when executing that piece of software on its processing circuitry 36. It should be understood that one or more of the steps or sub-steps of method 200 may be omitted in some embodiments. Similarly, in some embodiments, one or more steps or sub-steps may be combined together or performed in a different order. Step 210 of method 200 marked with dashed lines may be deemed to be either optional or performed in only certain embodiments. Method 200 is performed by client computing device 32(a) in communication with server computing device 60 over network 35.

In some embodiments, method 200 begins with step 210. In step 210, EMA 54 creates a key proxy 56. In some embodiments, key proxy 56 is created in such a manner that it does not look like a regular encryption key 68. That is, it is decorated differently than a typical encryption key (e.g., different headers, different mathematical characteristics, etc.) so that a hacker searching persistent storage 44, 52 for an encryption key 68 will be unlikely to find the key proxies 56. It should be understood that the key proxies 56 themselves are not capable of being used to decrypt encrypted data 76 (and they should not be used to encrypt data 74 either). Rather, a key proxy 56 is used as a means for uniquely identifying which encryption key 68 is used for decrypting particular encrypted data 76 stored in persistent storage 44, 52 (and for deciding which encryption key 68 should be used for encrypting particular non-encrypted data 74 for storage). In other embodiments, step 210 may be omitted by EMA 54 if it is later performed by KMA 62.

In step 220, EMA 54 authenticates to the KMA 62 running on the server computing device 60 across the network 35. In some embodiments, this may include opening a secure channel. Step 220 includes sending credentials to the KMA 62, such as, for example, credentials of the EMA 54 or of the client computing device 32(*a*) so that the KMA 62 can be sure that a hacker is not trying to spoof access. In one embodiment, sending credentials may include signing a known message with a private key pre-assigned to either the EMA 54 or the client computing device 32(*a*). KMA 62 can then verify the signature with reference to the paired public key published for either the EMA 54 or the client computing device 32(*a*). A secure channel, such as using Transport Layer Security (TLS), Secure Shell (SSH), or similar protocols, can then be established between EMA 54 and KMA 62 by any known key exchange or key agreement protocol.

In step 230, EMA 54 requests a key assignment from KMA 62 over the network 35. This may be done over the secure channel. In one embodiment, step 230 includes sending the key proxy 56 created in step 210 to KMA 62 as part of a key proxy assignment request 80. In another embodiment, in which step 210 was not performed, step 230 includes sending a key proxy assignment request 80 to KMA 62 without including a key proxy 56 therein. In that embodiment, KMA 62 is configured to create and return the key proxy 56 later.

In response, in step 240, EMA 54 receives confirmation of the key assignment from the KMA 62 across the network 35. This informs EMA 54 that a key 68 has been created and stored by KMA 62 in association with the key proxy 56, although EMA 54 is not informed of the value of the key 68. In some embodiments, step 240 includes receiving an assignment confirmation message 82 from the KMA 54. In some embodiments, assignment confirmation message 82 is received over the secure channel created in step 220. In some embodiments (e.g., when step 210 was omitted), assignment confirmation message 82 includes the key proxy 56.

FIG. 3B illustrates an example method 300 performed by KMA 62 running on server computing device 60 in conjunction with other applications for setting up an encryption key 68 and associated key proxy 56. It should be understood that one or more of the steps or sub-steps of method 300 may be omitted in some embodiments. Similarly, in some embodiments, one or more steps or sub-steps may be combined together or performed in a different order. Sub-steps 342 and 344 of method 300 marked with dashed lines may be deemed to be either optional or representative of alternative embodiments. Method 300 is performed by server computing device 60 in communication with client computing device 32(*a*) over network 35. Method 300 may be performed by KMA 62 in concert with method 200 performed by EMA 54.

In step 310, KMA 62 authenticates the EMA 54 running on client computing device 32(*a*) across the network 35. In some embodiments, this may include opening a secure channel. Step 310 includes receiving credentials from the EMA 54, such as, for example, credentials of the EMA 54 or of the client computing device 32(*a*) so that the KMA 62 can be sure that a hacker is not trying to spoof access. In one embodiment, receiving credentials may include receiving a known message signed with a private key pre-assigned to either the EMA 54 or the client computing device 32(*a*). KMA 62 can then verify the signature with reference to the paired public key published for either the EMA 54 or the client computing device 32(*a*). A secure channel, such as using TLS, SSH, or similar protocols, can then be established between EMA 54 and KMA 62 by any known key exchange or key agreement protocol.

In step 320, KMA 62 receives a request for a key assignment from EMA 54 over the network 35. This may be done over the secure channel. In one embodiment, step 320 includes receiving a key proxy 56 as part of a key proxy assignment request 80. In another embodiment (e.g., when step 210 was not performed by EMA 54 as part of method 200), step 320 includes receiving a key proxy assignment request 80 without any key proxy 56 included therein. In that embodiment, KMA 62 creates a key proxy 56 as part of step 320 (see above at step 210).

In step 330, KMA 62 creates an encryption key 68 to associate with the key proxy 56 received (or created) in step 320.

In step 340, KMA 62 causes the key 68 (created in step 330) to be stored in a secure vault 64 in association with the key proxy 56. In some embodiments, step 340 also includes associating the key proxy 56 with the credentials of the client computing device 32(*a*) or of the particular instance of the EMA 54 running on the client computing device 32(*a*) as received in step 310. In some embodiments, step 340 includes encrypting the key 68 within the vault 64 using the key proxy 56 and/or the credentials from step 310.

In some embodiments, performance of step 340 may include performance of sub-step 342. In sub-step 342, KMA 62 stores the key 68 (in association with the key proxy 56 and, optionally, credentials) locally within the secure vault 64 on local persistent storage 44 of the server computing device 60.

In other embodiments, performance of step 340 may include performance of sub-step 344. In sub-step 344, KMA 62 sends the key 68 and the key proxy 56 (and, in some embodiments, also the credentials received in step 310) over another secure channel over network 35 to remote key storage server 72 to be stored in the vault 64 of the remote key storage server 72.

In step 350, KMA 62 sends confirmation of the key assignment to the EMA 54 across the network 35. This informs EMA 54 that a key 68 has been created and stored by KMA 62 in association with the key proxy 56, although EMA 54 is not informed of the value of the key 68. In some embodiments, step 350 includes sending an assignment confirmation message 82 to the EMA 54. In some embodiments, assignment confirmation message 82 is sent over the secure channel created in step 310. In some embodiments (e.g., when step 210 was not performed by EMA 54 as part of method 200), assignment confirmation message 82 includes the key proxy 56.

Figure 4A:
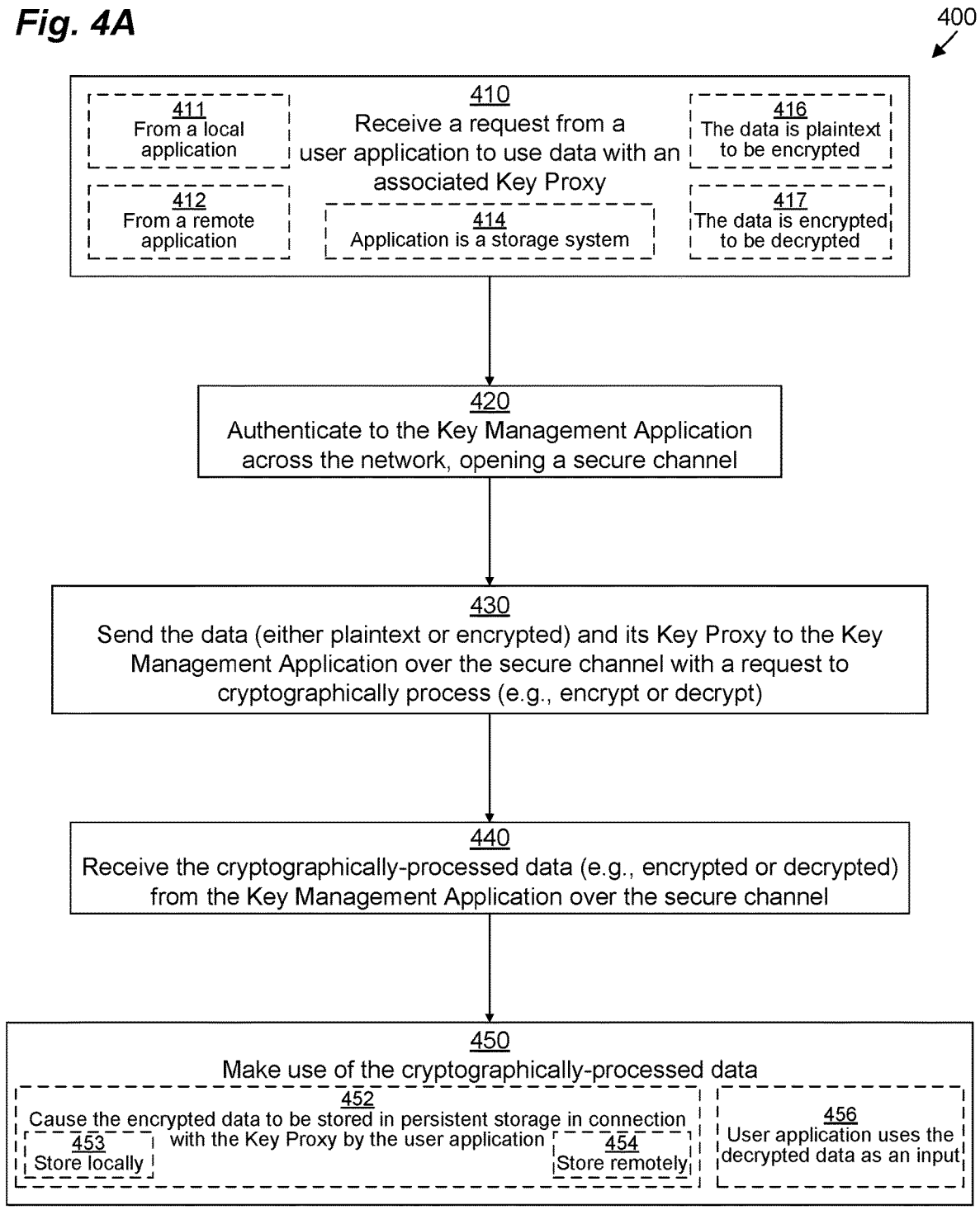
FIGS. 4A and 4B are flowcharts depicting example methods of various embodiments from various perspectives.

FIG. 4A illustrates an example method 400 performed by client computing device 32(a) in conjunction with other applications for initiating cryptographic processing of data with reference to a key proxy 56. It should be understood that one or more of the steps or sub-steps of method 400 may be omitted in some embodiments. Similarly, in some embodiments, one or more steps or sub-steps may be combined together or performed in a different order. Sub-steps 411, 412, 414, 416, 417, 452, 453, 454, and 456 of method 400 marked with dashed lines may be deemed to be either optional or representative of alternative embodiments. Method 400 is performed by client computing device 32(a) in communication with server computing device 60 over network 35. Method 400 is performed after EMA 54 has already set up a key proxy 56 in association with a key 68 on server computing device 60 (see method 200 of FIG. 3A).

In step 410, EMA 54 receives a request (e.g., a protected data access request 84) from a user application 48 to use data with an associated key proxy 56.

In one embodiment, step 410 includes sub-step 411 in which the user application 48 runs locally on the client computing device 32(a). In another embodiment, step 410 includes sub-step 412 in which the user application 48 runs remotely on a remote user device 46.

In some embodiments, step 410 includes sub-step 414 in which the user application 48 is a data storage application configured to process data storage requests including requests directed at local persistent data storage 44 or remote persistent data storage 52 (e.g., cloud data storage).

In one embodiment, step 410 includes sub-step 416 in which the data to be used is non-encrypted user data 74, and the use includes encrypting that data 74 with a key 68 identified by a key proxy 56 to become encrypted data 76, which may be written to persistent storage 44, 52.

In another embodiment, step 410 includes sub-step 417 in which the data to be used is encrypted user data 76 stored on persistent storage 44, 52 in association with a key proxy 56, and the use includes decrypting that data 76 with a key 68 identified by the key proxy 56.

In step 420, EMA 54 authenticates to the KMA 62 running on the server computing device 60 across the network 35, including opening a secure channel. Step 420 includes sending credentials to the KMA 62, such as, for example, credentials of the EMA 54 or of the client computing device 32(a) so that the KMA 62 can be sure that a hacker is not trying to spoof access. In one embodiment, sending credentials may include signing a known message with a private key pre-assigned to either the EMA 54 or the client computing device 32(a). KMA 62 can then verify the signature with reference to the paired public key published for either the EMA 54 or the client computing device 32(a). A secure channel, such as using TLS, SSH, or similar protocols, can then be established between EMA 54 and KMA 62 by any known key exchange or key agreement protocol.

In step 430, EMA 54 sends data (e.g., either non-encrypted user data 74 or encrypted user data 76) and its associated key proxy 56 to KMA 62 over the secure channel with a request to cryptographically process it. For example, EMA 54 may send a cryptographic request 86 including a key proxy 56 and either non-encrypted data 74 or encrypted data 76 and either a request to encrypt or a request to decrypt.

In response, in step 440, EMA 54 receives cryptographically-processed data 88 (e.g., encrypted or decrypted) from the KMA 62 over the secure channel. Then, in step 450, user application 48 makes use of the cryptographically-processed data 88. In sub-step 452, in embodiments in which the cryptographically-processed data 88 is encrypted data 76, user application 48 causes the encrypted data 76 to be stored in persistent storage 44, 52 in connection with the key proxy 56. In one embodiment, in sub-sub-step 453, the encrypted data 76 is stored in local persistent storage 44. In another embodiment, in sub-sub-step 454, the encrypted data 76 is stored in remote persistent storage 52.

In sub-step 456, in embodiments in which the cryptographically-processed data 88 is decrypted data 74, user application 48 uses the decrypted data 74 as an input for further processing or for sending to another user application.

Figure 4B:
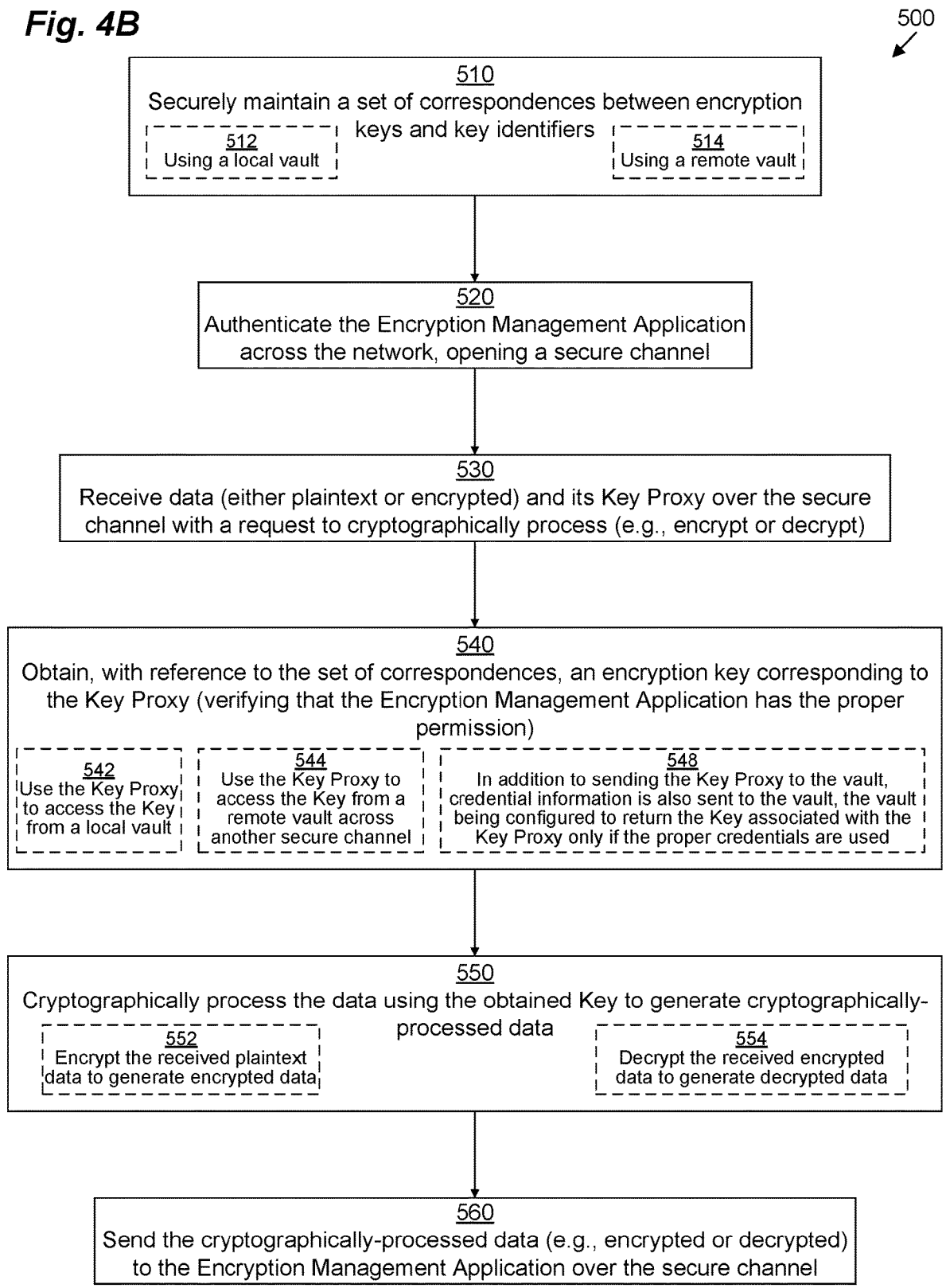

FIG. 4B illustrates an example method 500 performed by KMA 62 running on server computing device 60 in conjunction with other applications for performing cryptographic processing on data with reference to a key proxy 56. It should be understood that one or more of the steps or sub-steps of method 500 may be omitted in some embodiments. Similarly, in some embodiments, one or more steps or sub-steps may be combined together or performed in a different order. Sub-steps 512, 514, 542, 544, 548, 552, and 554 of method 500 marked with dashed lines may be deemed to be either optional or representative of alternative embodiments. Method 500 is performed by server computing device 60 in communication with client computing device 32(a) over network 35. Method 500 may be performed by KMA 62 in concert with method 400 performed by client computing device 32(a).

In step 510, KMA 62 securely maintains a set of correspondences 66 between encryption keys 68 and key identifiers (e.g., key proxies 56). In some embodiments, step 510 includes sub-step 512, in which the set of correspondences is maintained in a local vault 64 stored in persistent storage 44 of the server computing device 60. In other embodiments, step 510 includes sub-step 514, in which the set of correspondences is maintained in a remote vault 64 stored in persistent storage of a remote key storage server 72. See method 300 above for further details on how the set of correspondences 66 is maintained.

In step 520, KMA 62 authenticates the EMA 54 running on client computing device 32(a) across the network 35, including opening a secure channel. Step 520 includes receiving credentials from the EMA 54, such as, for example, credentials of the EMA 54 or of the client computing device 32(a) so that the KMA 62 can be sure that a hacker is not trying to spoof access. In one embodiment, receiving credentials may include receiving a known message signed with a private key pre-assigned to either the EMA 54 or the client computing device 32(a). KMA 62 can then verify the signature with reference to the paired public key published for either the EMA 54 or the client computing device 32(a). A secure channel, such as using TLS, SSH, or similar protocols, can then be established between EMA 54 and KMA 62 by any known key exchange or key agreement protocol.

In step 530, KMA 62 receives data (either plaintext data 74 or encrypted data 76) and an associated key proxy 56 from EMA 54 over the secure channel with a request to cryptographically process (e.g., to encrypt or decrypt).

Afterwards, in step 540, KMA 62 obtains, with reference to the set of correspondences 66, an encryption key 68 corresponding to the key proxy 56 received in step 530. In some embodiments, KMA 62 first verifies that the EMA 54 has the proper permission to make use (albeit indirectly) of that encryption key 68.

In some embodiments, step 540 may include sub-step 542, while in other embodiments, step 540 includes sub-step 544. In sub-step 542, KMA 62 uses the key proxy 56 to access its associated key 68 from the local vault 64. In sub-step 544, KMA 62 uses the key proxy 56 to access its associated key 68 from the remote vault 64 on remote key storage server 72 using another secure channel established between the server computing device 60 and the remote key storage server 72 over network 35.

In some embodiments, in addition to using the key proxy 56 to access its associated key 68 from a vault 64, step 540 also includes sub-step 548 in which it also sends credential information (e.g., the credential information received in step 520) to the vault 64, the vault 64 being configured to return the key 68 associated with the key proxy 56 only if the proper credentials are used (e.g., use of client ID 70(a) would be required to access key 68(1)).

Once the key 68 is obtained, in step 550, KMA 62 cryptographically processes the data from step 530 using the obtained key 68 to generate cryptographically-processed data 88. In embodiments in which the data received in step 530 was plaintext (also referred to as non-encrypted) user data 74, KMA 62 performs step 550 by performing sub-step 552. In sub-step 552, KMA 62 encrypts the user data 74 using the key 68 to generate encrypted data 76 as the cryptographically-processed data 88.

In embodiments in which the data received in step 530 was encrypted data 76, KMA 62 performs step 550 by performing sub-step 554. In sub-step 554, KMA 62 decrypts the encrypted data 76 using the key 68 to generate decrypted data 74 as the cryptographically-processed data 88.

Finally, in step 560, KMA 62 sends the cryptographically-processed data 88 (e.g., encrypted data 76 or decrypted data 74) to the EMA 54. This may be done over the secure channel, particularly in the case of sending decrypted data 74 as the cryptographically-processed data 88.

Thus, techniques have been presented for securely storing keys 68 on one or more servers 60, 72 remote from encryption management applications 54 with a requirement for authentication to allow encryption management applications 54 running on a variety of systems (e.g., client computing devices 32(a), . . . ) to access the keys 68 using key proxies 56 while still maintaining security. This result may be accomplished by having the encryption management applications 54 run on one computer (e.g., client computing devices 32(a)) while authenticating to a remote computer 60 that securely stores the keys 68 in a vault 64 (or that remotely maintains the keys 68 in a vault 64 on a remote key storage server 72). The remote computer 60, after locating a key 68 in a vault 64 using the key proxy 56 provided by the encryption management application 54, performs the encryption or decryption of the data itself, so that the encryption management applications 54 do not need to directly access the keys 68. Rather, the encryption management applications 54 only need authenticate with the remote server 60 to prove their identity and permission to use the keys 68 in question As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of cryptographic processing across a network, the method comprising:
   securely maintaining, by a computing device, a set of correspondences between encryption keys and key identifiers, wherein securely maintaining the set of correspondences between encryption keys and key identifiers includes:
      receiving a key request from a remote device across the network, the key request including a key identifier from the remote device and credentials of the remote device, the key request not including any data to be cryptographically processed;
      in response to receiving the key request, authenticating the credentials of the remote device;
      in response to successfully authenticating the credentials of the remote device from the key request, generating an encryption key to be associated with the key identifier from the key request; and
      in response to generating the encryption key, storing the encryption key in a secure vault, access to the encryption key within the secure vault requiring the associated key identifier and credentials of the remote device;
   subsequent to storing the encryption key in the secure vault, receiving, by the computing device, a cryptographic request from the remote device across the network, the cryptographic request including the credentials, data to be cryptographically processed, and the key identifier to be used for cryptographic processing; and in response to successfully authenticating the cryptographic request:

obtaining, by the computing device with reference to the set of correspondences, the encryption key corresponding to the key identifier and verifying that the remote device has permission to use the encryption key corresponding to the received key identifier, including accessing the secure vault using the key identifier and the credentials from the cryptographic request;

cryptographically processing, by the computing device, the received data using the obtained encryption key to generate cryptographically-processed data; and sending the cryptographically-processed data from the computing device across the network to the remote device;

wherein the encryption key is maintained securely within the computing device without being transmitted over the network.

2. The method of claim 1,
wherein the data to be cryptographically processed is unencrypted;
wherein cryptographically processing includes encrypting the data using the obtained encryption key; and
wherein the cryptographically-processed data is encrypted.

3. The method of claim 2 wherein the data to be cryptographically processed is received by the computing device over a secured channel.

4. The method of claim 1,
wherein the data to be cryptographically processed is encrypted;
wherein cryptographically processing includes decrypting the data using the obtained encryption key; and
wherein the cryptographically-processed data is decrypted.

5. The method of claim 4 wherein sending the cryptographically-processed data from the computing device across the network to the remote device includes sending the decrypted cryptographically-processed data to the remote device over a secured channel.

6. The method of claim 1 wherein obtaining the encryption key corresponding to the key identifier and verifying that the remote device identified by the credentials has permission to use the encryption key includes:

sending the key identifier and the credentials of the remote device across a secure channel to a remote key storage server, the remote key storage server storing the encryption key protected by the key identifier and the credentials of the remote device; and in response to sending the key identifier and the credentials to the remote key storage server, receiving the encryption key across the secure channel.

7. A system for cryptographic processing comprising:
a network;
a client computing device communicatively connected to the network; and
a server computing device communicatively connected to the network, the server computing device configured to:

securely maintain a set of correspondences between encryption keys and key identifiers, wherein securely maintaining the set of correspondences between encryption keys and key identifiers includes:

receiving a key request from the client computing device across the network, the key request including a key identifier from the client computing device and credentials of the client computing device, the key request not including any data to be cryptographically processed;

in response to receiving the key request, authenticating the credentials of the client computing device;

in response to successfully authenticating the credentials of the client computing device from the key request, generating an encryption key to be associated with the key identifier from the key request; and in response to generating the encryption key, storing the encryption key in a secure vault, access to the encryption key within the secure vault requiring the associated key identifier and credentials of the client computing device;

receive, subsequent to storing the encryption key in the secure vault, a cryptographic request from the client computing device across the network, the cryptographic request including the credentials, data to be cryptographically processed, and the key identifier to be used for cryptographic processing; and in response to successfully authenticating the cryptographic request:

obtain, with reference to the set of correspondences, the encryption key corresponding to the key identifier and verify that the client computing device has permission to use the encryption key corresponding to the received key identifier, including accessing the secure vault using the key identifier and the credentials from the cryptographic request;

cryptographically process the received data using the obtained encryption key to generate cryptographically-processed data; and send the cryptographically-processed data across the network to the client computing device;

wherein the client computing device is configured to:
send the key request and the cryptographic request to the server computing device across the network;
receive the cryptographically-processed data from the server computing device across the network; and
make use of the received cryptographically-processed data; and wherein the encryption key is maintained securely within the server computing device without being transmitted over the network.

8. The system of claim 7,
wherein the data to be cryptographically processed is unencrypted;
wherein cryptographically processing includes encrypting the data using the obtained encryption key;
wherein the cryptographically-processed data is encrypted; and
wherein making use of the received cryptographically-processed data includes causing the encrypted data to be stored in persistent storage in connection with the key identifier.

9. The system of claim 8 wherein causing the encrypted data to be stored in persistent storage in connection with the key identifier includes storing the encrypted data and the key identifier in persistent storage of the client computing device.

10. The system of claim 8 wherein causing the encrypted data to be stored in persistent storage in connection with the key identifier includes sending a storage request to a remote storage device directing the remote storage device to persistently store the encrypted data and the key identifier.

11. The system of claim 10,
wherein the encryption key is stored in a standard key format; and
the key identifier is stored in a format different from the standard key format.

12. The system of claim 8 wherein the client computing device is configured to send the data to be cryptographically processed to the server computing device over a secured channel.

13. The system of claim 7,
wherein the data to be cryptographically processed is encrypted;
wherein cryptographically processing includes decrypting the data using the obtained encryption key;
wherein the cryptographically-processed data is decrypted; and
wherein making use of the received cryptographically-processed data includes sending the decrypted data to an application that requested access to that data.

14. The system of claim 13 wherein sending the cryptographically-processed data across the network to the client computing device includes sending the decrypted data to the client computing device over a secured channel.

15. The system of claim 7 wherein obtaining the encryption key corresponding to the key identifier and verifying that the client computing device identified by the credentials has permission to use the encryption key includes:
sending the key identifier and the credentials of the client computing device across a secure channel to a remote key storage server, the remote key storage server storing the encryption key protected by the key identifier and the credentials of the client computing device; and
in response to sending the key identifier and the credentials to the remote key storage server, receiving the encryption key across the secure channel.

16. A computer program product comprising a non-transitory computer-readable storage medium storing a set of instructions, which, when executed by a computing device, cause the computing device to:
securely maintain a set of correspondences between encryption keys and key identifiers, wherein securely maintaining the set of correspondences between encryption keys and key identifiers includes:
receiving a key request from a remote device across a network, the key request including a key identifier from the remote device and credentials of the remote device, the key request not including any data to be cryptographically processed;
in response to receiving the key request, authenticating the credentials of the remote device;
in response to successfully authenticating the credentials of the remote device from the key request, generating an encryption key to be associated with the key identifier from the key request; and
in response to generating the encryption key, storing the encryption key in a secure vault, access to the encryption key within the secure vault requiring the associated key identifier and credentials of the remote device;
receive, subsequent to storing the encryption key in the secure vault, a cryptographic request from the remote device across the network, the cryptographic request including the credentials, data to be cryptographically processed, and the key identifier to be used for cryptographic processing; and
in response to successfully authenticating the cryptographic request:
obtain, with reference to the set of correspondences, the encryption key corresponding to the key identifier and verify that the remote device has permission to use the encryption key corresponding to the received key identifier, including accessing the secure vault using the key identifier and the credentials from the cryptographic request;
cryptographically process the received data using the obtained encryption key to generate cryptographically-processed data; and
send the cryptographically-processed data across the network to the remote device;
wherein the encryption key is maintained securely within the computing device without being transmitted over the network.

* * * * *